A. A. DE MARS.
VEHICLE BRAKE.
APPLICATION FILED JAN. 25, 1911.

1,009,651. Patented Nov. 21, 1911.

WITNESSES:

INVENTOR
Alfred A. De Mars
BY J. B. Fay
ATTORNEY

UNITED STATES PATENT OFFICE.

ALFRED A. DE MARS, OF CLEVELAND, OHIO.

VEHICLE-BRAKE.

1,009,651.

Specification of Letters Patent.   Patented Nov. 21, 1911.

Application filed January 25, 1911. Serial No. 604,532.

*To all whom it may concern:*

Be it known that I, ALFRED A. DE MARS, a citizen of the United States, and a resident of Cleveland, county of Cuyahoga, and State of Ohio, have invented a new and useful Improvement in Vehicle-Brakes, of which the following is a specification, the principle of the invention being herein explained and the best mode in which I have contemplated applying that principle, so as to distinguish it from other inventions.

The object of the invention is the provision of improved braking mechanism particularly adapted for use on motor vehicles such as automobiles, power-trucks and the like, wherein the friction and wear involved in present constructions of brake may in large part be eliminated and, at the same time, a readier and more effective control of the braking operation is obtained.

To the accomplishment of the foregoing and related ends said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 1:
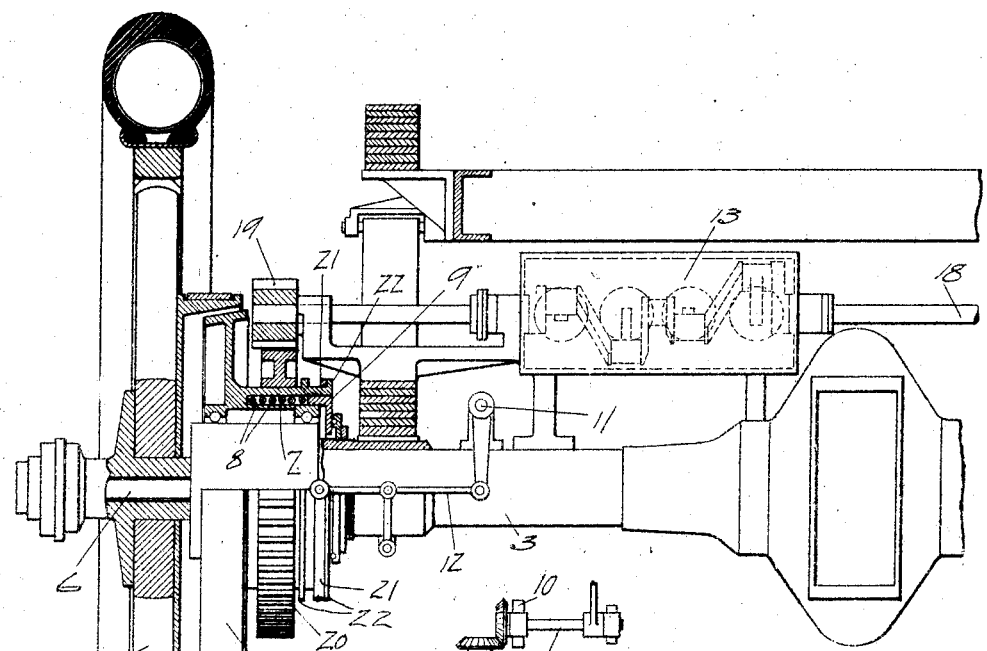
Figure 2:
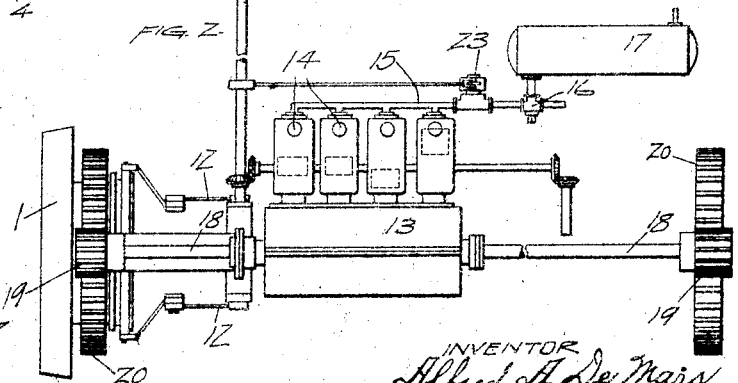
Figure 2:

In said annexed drawing:—Figure 1 is a broken rear elevation of the driving axle of an automobile with my improved braking mechanism attached thereto and certain of the parts; and Fig. 2 is a plan view, more or less diagrammatic in character, illustrating the general arrangement and inter-connection of the parts of such mechanism.

The braking mechanism proper in my improved construction, comprises a convex cone-member 1 that is carried by a sleeve 2 so as to be longitudinally reciprocable on the axle-housing 3 into contact with a complementary, or concave, cone-member 4 carried by the wheel 5 which is to be braked. This wheel is carried and driven through a live axle 6 within the housing 3 in the usual fashion, and the disposition of said brake member 4 corresponds with that of the usual brake drum in automobiles, as at present constructed. An emergency brake band 7, adapted to be operated in the usual fashion, may be applied to the outer surface of this member if deemed desirable.

A coil spring 8 disposed within the reciprocable sleeve 2 that carries the inner brake-member, abuts at one end against a shoulder on said sleeve, and, at the other end, against a rotatable disk 9 that is, however, held against longitudinal movement on the axle housing, although its position may be adjusted therealong. As a result of the foregoing, the tendency of the spring is to throw said inner brake-member into engagement with the outer brake-member, the strength of the spring being sufficient to effectively lock the two members together. Normally, however, said sleeve is held in retracted position and the member carried thereby out of such contact, by means of a lever 10 (see Fig. 2), designed to be operated by the driver of the vehicle and connected with said sleeve by a suitable system of intergeared shafts 11 and links 12, as will be readily understood. In other words, the inner brake-member may be thrown into engagement with the outer brake-member, at the option of the driver, by the simple movement of the lever 10, and such engagement again similarly broken. Mounted likewise most conveniently upon the rear axle housing, although this is a matter of indifference so far as the operative effect is concerned, is an air compressor 13, preferably comprising a plurality of cylinders so as to reduce their individual size and render operation smooth. The respective cylinders of this compressor are provided with valves 14 opening inwardly in the usual fashion to admit air and discharge into a common main 15 which may either open to atmosphere, or be connected by proper operation of a valve 16 with a storage tank 17. Operation of this discharge-controlling valve is had by means of any suitable means as a lever or the like (not shown) disposed in convenient reach of the operator.

The pistons within the respective cylinders of the air compressor are operated from a common crank-shaft 18 disposed parallel with the vehicle axle 6 and carrying pinions 19 in mesh with gears 20 fixedly mounted upon the reciprocable sleeves at each end of said axle. The faces of the pinions 19 are sufficiently long to be retained in engagement with said gears irrespective of the longitudinal positions of the sleeves, as the brake members 1 carried by the latter are thrown into and out of engagement with the complementary brake members 4. It should further be explained that there is a certain amount of play in the connection between the operating shaft 11 and the respective sleeves, such play being conveniently provided for between the ring 21 that forms the specific means of connection with the sleeve, and the shoulders 22 of said sleeve which limit the ring's movement. A valve 23 which is located in discharge manifold 15 before valve 16, thus completely controlling the discharge of the air-compressor, is then connected with shaft 11 so as to begin to close only after the brake members are in engagement, so that the degree of closure may be varied within the further range of movement of the operating parts permitted by the sliding connection of the ring with the sleeve.

The general operation of the foregoing described mechanism may now be briefly set forth. Normally the brake-members 4 carried by the wheels are entirely free from the members carried by the sleeves. When it is desired to throw on the brakes, the compression springs that operate the sleeves are freed by a preliminary actuation of the lever 10, so that the sleeves rotate with the wheels, thereby, at same time, rotating the crank-shaft 18 of the compressor. Such preliminary actuation of the lever 10, however, does not close the valve 23 that controls the discharge from the cylinders of the compressor. The pistons in the latter accordingly run free until, upon further movement of the lever, said valve gradually closes, finally entirely cutting off the discharge. The pressure in the cylinders correspondingly gradually rises until a point is reached where further rotation of the crank shaft is stopped, and the brake thus rendered fully effective. Obviously, any intermediate amount of braking effect may be secured by a corresponding disposition of said discharge-controlling valve. When it is desired, the discharge pipe may be connected, by proper actuation of valve 16, with the air storage cylinder 17 and a supply of pressure fluid thus secured for use in filling tires, or for such various other purposes about a vehicle, as may be found desirable. In the normal position, however, of said valve, it allows the air to escape directly into the atmosphere. Said valve, it should further be explained, is operated independently of the discharge-controlling valve and its connections.

Other modes of applying the principle of my invention may be employed instead of the one explained, change being made as regards the mechanism herein disclosed provided the means stated by any of the following claims or the equivalent of such stated means be employed.

I therefore particularly point out and distinctly claim as my invention:—

1. In a vehicle, the combination with the wheel to be braked; a brake member carried thereby; a second brake member adapted optionally to be rotated by said wheel; an air compressor geared to said second brake member and adapted to be driven thereby; a valve adapted gradually to shut off the discharge from said air compressor, thereby building up a pressure therein; and an air storage tank adapted to receive such discharge when desired.

2. In a vehicle, the combination with the wheel to be braked; a brake member carried thereby; a second brake member movable into and out of engagement therewith; resilient means tending to throw said second member into such engagement; an operating element for retaining said second brake member out of such engagement; an air compressor geared to said second brake member so as to be driven thereby; a valve adapted to gradually shut off the discharge from said air-compressor so as to build up pressure therein; and connections between said valve and operating element, there being a lost motion between the connections of said second brake member and valve with said element, whereby said member is first thrown into engagement and said valve then operated.

Signed by me this 19th day of January, 1911.

ALFRED A. DE MARS.

Attested by—
 ANNA L. GILL,
 JOS. F. OBERLIN.